J. M. GERARD AND H. J. MASSON, Jr.
PROCESS FOR THE PRODUCTION OF LAMPBLACK.
APPLICATION FILED DEC. 23, 1918. RENEWED MAY 29, 1920.
1,364,273.
Patented Jan. 4, 1921.
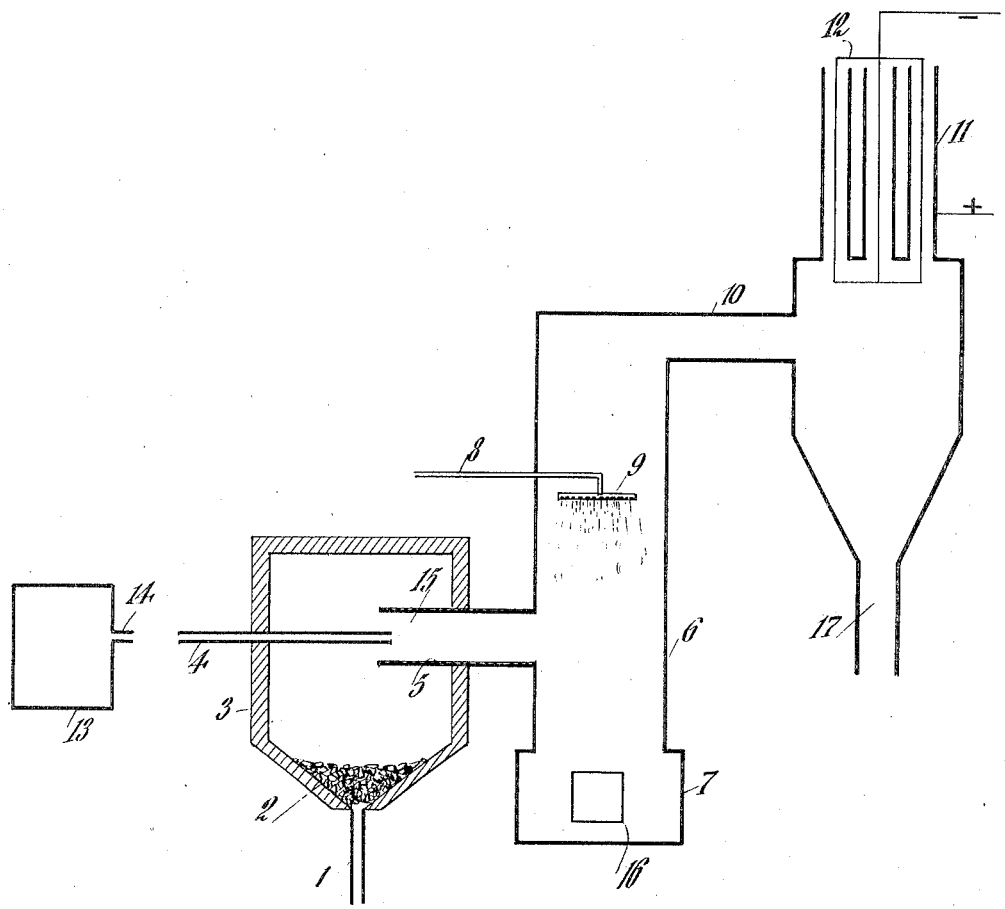

UNITED STATES PATENT OFFICE.

JULIAN M. GERARD AND HENRY J. MASSON, JR., OF NEW YORK, N. Y.; SAID MASSON ASSIGNOR TO SAID GERARD.

PROCESS FOR THE PRODUCTION OF LAMPBLACK.

1,364,273.     Specification of Letters Patent.     Patented Jan. 4, 1921.

Application filed December 23, 1918, Serial No. 267,891. Renewed May 29, 1920. Serial No. 385,389.

*To all whom it may concern:*

Be it known that we, JULIAN M. GERARD and HENRY J. MASSON, Jr., citizens of the United States, residing at New York, in the county of New York and State of New York, have invented certain new and useful Improvements in Process for the Production of Lampblack, of which the following is a specification.

Our invention relates to the production of a highly superior grade of carbon black or lamp black by means of the decomposition of a suitable carbon compound into its elements, with little or no reaction between these elements.

The process most commonly employed heretofore for the production of carbon black from carbon compounds depends upon the incomplete combustion of such a compound and while it is in contact with a collecting surface or surfaces, such as a large iron plate or the like. Such a method is very wasteful as it only produces in actual operation less than three per cent. of the theoretical maximum yield. For example, only about one pound of carbon black is produced by the process most frequently used up to the present from one thousand cubic feet of natural gas, from which 35 pounds may be theoretically obtained.

Attempts have been heretofore made to decompose a carbon compound by passing it through a tubular apparatus heated to a high temperature, sufficient to decompose the carbon compound into its elements. Such attempts have not been successful mainly because hard coked carbon was deposited in these tubes, which clogged them up. Besides, since the carbon black was permitted to remain in the zone of high temperature, it deteriorated in quality and lost the desired deep black luster and became much duller and gray. This deterioration was emphasized by the fact that high temperatures, usually about 1200° C., were necessary to completely decompose a carbon compound in this manner.

According to our method and by the use of our apparatus the carbon compound in form of a gas or vapor is heated by direct contact or intermingling with a highly heated gas or gases, the contact or intermingling taking place in an inclosed space, so that the high temperature necessary to decompose the carbon compound is instantly secured. At the same time the decomposed gases which have the free carbon present in them in the form of minute particles are caused to rapidly move away from the region of high temperature, so as to avoid the deposit of any substantial quantity of the free carbon on the walls of the inclosed space and so avoid any further reactions between the liberated carbon and any of the gaseous products subject to the high temperature. The heated gases are preferably cooled very rapidly, as for instance by a spray of water as soon as they have passed out of the region or zone of high temperature, the temperature being preferably maintained above 100° C., so that the water is carried along in the form of steam with the cooled gases that carry along the carbon particles. The purpose of rapid cooling is to prevent reactions between the carbon and the gases present. The cooled carbon particles are then collected preferably by the electrical precipitation method and apparatus previously disclosed in U. S. Patent No. 1,278,137.

Other objects of our invention will be disclosed in the following description and drawings which illustrate the preferred embodiment of our apparatus for carrying out the preferred form of our method.

The drawing illustrates our apparatus in a diagrammatic manner, it being understood that it is not drawn to scale. An explosive mixture of air and combustible gas is led through the inlet pipe 1 to the refractory bed 2, of a surface combustion furnace in which carbon-dioxid at a high temperature is generated. Or carbon monoxid may be generated and fed into the furnace and unite with oxygen in chamber 15 and the heat developed in this exothermic reaction decomposes the carbon compound. This decomposition unit is surrounded by refractory material 3 as is known, and other suitable means for securing carbon dioxid at a high temperature may be employed. The gas or vapor which contains the carbon and is to be decomposed, enters the reaction chamber or zone, through a pipe 4 made of refractory material which also serves to preheat the vapors, but not decompose them. On the opposite side of the furnace a larger pipe 5 made of refractory material is inserted and the pipe 4 projects a slight distance into the pipe 5. As the carbon-containing vapors or gases emerge from the pipe 4, their velocity falls because of the greater diameter of the pipe 5, and they come into contact with the highly heated carbon dioxid, which has a temperature sufficient to so highly heat each carbon compound, as to decompose it. The zone or region of the heat and decomposition is indicated by 15. The gases are passed through the pipe 5, with such high velocity that the products of the decomposition are quickly removed from the zone of high temperature so as to minimize side reactions. As the parts of the apparatus are preferably made of refractory material which is a poor conductor of heat, this operation is facilitated. However, in order to quickly cool the products and prevent reactions between carbon and gases they are passed into the cooling tower 6, where the mingled gases are cooled by the water spray 9, of which 8 is the inlet. Just sufficient water is passed through the tower so as to cool the gases to temperatures above which further reactions would take place, the water however being maintained in the form of steam, so that no water collects in the tower. The tower is provided with a cleaning door 16. The products of the decomposition and the steam then pass through the pipe 10, where the temperature is also maintained above 100° C., so that no steam condenses, to an electrical precipitator 11, which is conventionally indicated and may be of any approved type as is shown for example in U. S. Patent No. 1,278,137. The carbon black is separated from the gases and is discharged from the outlet 17. The steam and other products may be separated from the hydrogen, and the various products may be purified and separated for commercial use.

When liquids or other organic compounds are to be used for making the carbon black they are vaporized in vaporizer 13, whose outlet 14 is then connected with pipe 4 by any suitable means. Hence, this process can be used with any organic compound which exists normally as a gas or can be converted to a vapor or to such form that it can be heated by a gas so as to secure the before mentioned results.

The reactions on which the process is based and which represent the theoretical maximum yield of our apparatus are as follows:

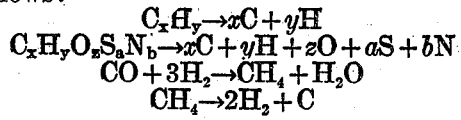

Equations 1 and 2 are generic and represent the action which takes place with any substances containing the elements mentioned in equation 1 or in equation 2. The reaction mentioned in equation 3 takes place in the reaction zone 15.

Although we have described a preferred embodiment of our invention it is clear that numerous changes and omissions could be made without departing from its spirit.

Thus other inert gases could be used instead of carbon dioxid, and other means could be used for very rapidly heating the carbon-containing vapors or their equivalent with great rapidity in an inert atmosphere, so as to very rapidly liberate the carbon in the form of minute particles, and remove these particles from the region of decomposition before they lose their desirable qualities. The steam could also be condensed before passing through the electrical precipitator, although its presence is preferable, as it assists in securing the efficient collection of the carbon black in the desired form or state. The flow of the hot carbon dioxid need not be in the same direction as the carbon-containing vapors at the time they are intermingled but this is preferable, because it facilitates the rapid removal of the carbon particles from the region of decomposition.

We claim:

1. A method of producing lamp black which consists in heating a carbon containing compound by means of direct contact with an inert gas, the said heat being sufficient to decompose the said compound into carbon and other substances, and removing the free carbon from the zone of heating.

2. A method of producing carbon which consists of rapidly heating an aeriform fluid containing carbon by direct contact and intermingling with a highly heated inert gas, the heat being sufficient to decompose the said fluid into finely divided particles of carbon and other products, and rapidly moving the said finely divided particles out of the said zone of heat, so that they are removed from the said zone before they lose their deep black color or further reactions take place among the products.

3. A method of producing lampblack which consists in heating an aeriform fluid containing carbon by means of direct contact with a highly heated inert gas, the temperature being sufficient to decompose the said fluid into carbon and other products, rapidly moving the said carbon and other products out of the zone of heating so that the said carbon does not lose its deep black color, and then cooling the intermingled substances, by means of a spray of water, the temperature being maintained above 100° C. during said cooling.

4. A method of producing lamp black which consists in heating an aeriform fluid containing carbon by means of direct contact with a highly heated inert gas or by the heat developed in an exothermic gaseous reaction, the temperature being sufficient to decompose the said fluid into carbon and other products, rapidly moving the said carbon and other products out of the zone of heating so that the said carbon does not lose its deep black color and then cooling the intermingled substances by means of a spray of water to prevent further reactions, the temperature being maintained above 100° C., and then collecting the said carbon by means of electrical precipitation.

5. In the art of producing lamp black, that step in the art which consists in highly heating a substance containing carbon by direct contact with a highly heated gas in an inert atmosphere.

6. In the art of producing lamp black, that step in the art which consists in intermingling a carbon-containing aeriform fluid moving in a given direction with a stream of highly heated inert gas moving in the same direction, the heat of the said inert gas being sufficient to decompose the said fluid into free carbon in the form of minute particles and other products, the velocity of the combined stream of said fluid and said inert gas being sufficient to remove said particles from the region of decomposition before they lose their luster or subsequent reaction takes place.

In testimony whereof we hereunto affix our signatures.

JULIAN M. GERARD.
HENRY J. MASSON, Jr.